Dec. 6, 1955  E. DEBLER  2,725,730
FINGER RINGS WITH A DETACHABLE, SLIDABLE CONNECTING MEANS
Filed June 23, 1952
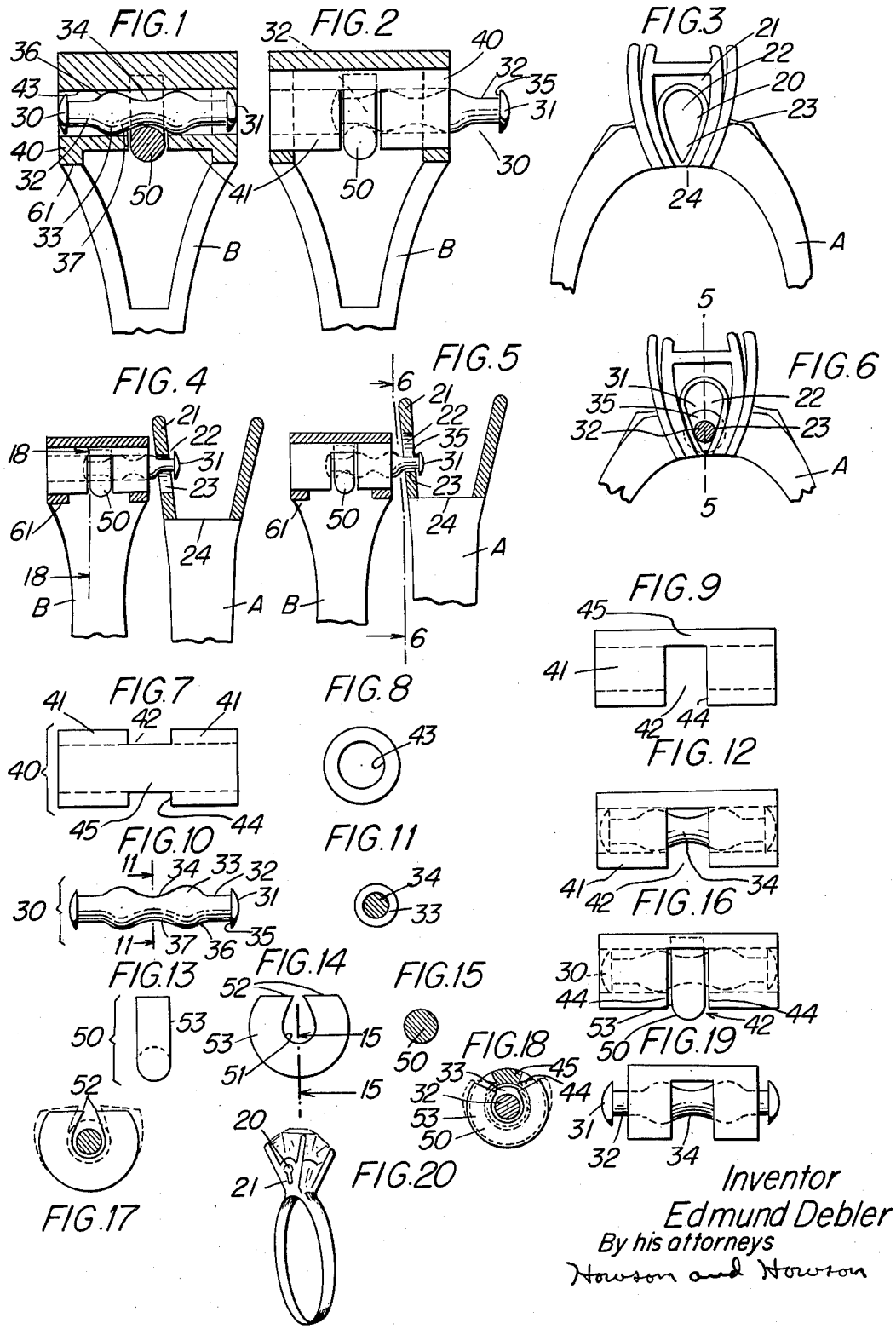
Inventor
Edmund Debler
By his attorneys
Howson and Howson

United States Patent Office 2,725,730
Patented Dec. 6, 1955

2,725,730

FINGER RINGS WITH A DETACHABLE, SLIDABLE CONNECTING MEANS

Edmund Debler, Hollis, N. Y., assignor to J. R. Woods & Sons, Inc., New York, N. Y., a corporation of New York Application June 23, 1952, Serial No. 295,047

4 Claims. (Cl. 63—15.2)

This invention relates to finger rings, and more particularly to finger rings provided with detachable, slidable connecting means for locking companion finger rings together.

When each of a pair of finger rings has ornamentation it frequently is desirable to keep the rings so aligned with each other that the ornamental part are oriented with relation to each other. A number of devices have been suggested for accomplishing this object but the known devices have disadvantages.

Some finger rings have rigid hooks or the like protruding from a side of one or each ring. This is objectionable because such a protruding portion is considered by many to lack aesthetic appeal. Other rings have locking means that can be retracted into the ring, but there are various objections to known devices of that sort. For example, some are too difficult to make on the small scale required in a finger ring. Others are too expensive to be practical, and others are too complicated for the wearer to operate.

The present invention relates to the class of finger ring assembly locking means in which one ring has a slot in the side of a setting that serves as a keyhole and the other ring has a retractable locking rod or key. The invention overcomes the objections heretofore met in rings of this class.

The locking means in a ring assembly according to my invention comprises a rod which slides lengthwise and rotates within one ring and which has a head and reduced neck which can be projected from a side of that ring and retracted again. This rod acts as an interlocking key. The companion ring has a keyhole with an enlarged portion capable of receiving the head of the rod and a reduced portion capable of receiving the neck of the rod but too small to admit the head. In this way when the neck of the rod is in the reduced portion of the keyhole, the head of the rod bears against the wall surrounding the keyhole, and the rings are held against displacement lengthwise of the rod. When the rings in this position are placed together on a human finger, they are held by the finger and the rod, against relative displacement to each other.

In the accompanying drawings,

Figure 1 is a vertical cross section through one side of the first ring of my assembly made in accordance with my invention with the rod in retracted inoperative position.

Figure 2 is a similar view, through a similar ring with a modified housing and with the rod extending into operative position.

Figure 3 is a side view of part of the second ring of my assembly with a keyhole for the rod suitable for use with the rings of Figures 1 and 2.

Figure 4 is a section on a smaller scale through one side of a pair of rings with the rod just after insertion in the keyhole of the companion or second ring.

Figure 5 is a similar section through the same rings after they have been moved to locking position, this view being taken on the line 5—5 of Figure 6.

Figure 6 is a section on a larger scale, on line 6—6 of Figure 5 looking in the direction of the arrow in that figure.

Figures 7 to 19 show details of the locking means.

Figure 7 is a top plan view of a housing for the rod.

Figure 8 is an end view of the housing of Figure 7.

Figure 9 is a view in side elevation of the housing of Figures 7 and 8.

Figure 10 is a side elevation of the key or rod such as used in the preceding figures.

Figure 11 is a cross section through the rod on the line 11—11 of Figure 10.

Figure 12 is a side elevation of the rod and housing of Figures 7 to 11 assembled in the inoperative position of Figure 1.

Figure 13 is a side elevation of a resilient, substantially U-shaped retaining member such as used in preceding figures.

Figure 14 is an end elevation of the same retaining member.

Figure 15 is a cross section through the retaining member on the line 15—15 in Figure 14.

Figure 16 is a side elevation of the housing, rod and retaining member of Figures 7 to 15 assembled together.

Figure 17 is an end view of the retaining member showing the same around the rod; the solid lines showing the retaining member in normal relaxed condition around a reduced portion of the rod; the dotted lines showing the retaining member strained apart around the largest diameter of the rod or key.

Figure 18 is a view in cross section on line 18—18 of Figure 4.

Figure 19 is a view in side elevation similar to Figure 12 and showing the rod or key and the retaining member mounted in a modified form of housing.

Figure 20 is a perspective view of a ring having a modified form of keyhole.

The novel ring assembly shown in Figures 1 to 3 consists of a first ring A having an opening such as a keyhole or slot 20 in the side of the setting or ornamental portion, and a companion ring B having a retractable rod 30 with an enlarged head 31 and a reduced neck 32. The rod moves in a housing 40, and in retaining means 50 which cooperates to hold the rod selectively in operative or inoperative position.

The locking means can be put in any sort of ring. In the embodiment illustrated in the drawings, the retractable sliding rod or key is shown in a wedding band B, and the companion ring A having the cooperating slot or keyhole is an engagement ring. As shown in Figure 3, the companion ring is a conventional "fishtail" engagement ring having in the side wall 21 of the setting a tear-drop shaped opening 20 with a wider portion at the top 22 and a portion 23 of reduced width at the bottom, i. e., near the finger opening 24.

The rod 30 which is used for a key is shown particularly in Figures 10 and 11. It comprises an elongated rod or wire of a length to be wholly contained within the recess in housing 40 and having on each end thereof a head 31 and a neck 32 of smaller size than the heads 31, a waist 34 between the necks 32, and continuously-curved intermediate portions 33 of greater diameter than the necks 32 and waist 34 and located between said waist 34 and each neck 32. As shown particularly in Figures 6, 11, 17 and 18, the rod is circular in cross section. The necks 32 and waist 34 are of reduced diameter as compared with the heads 31 and the continuously-curved intermediate portions 33. The necks 32 and the smallest part of the waist 34 are preferably of substantially the same diameter. The greatest diameter of the heads 31 is preferably substantially the same as that of the continuously-curved intermediate portions 33, and is about as great as the greatest width of the top 22 of the tear-drop opening or keyhole 20 so that the head 31 of the rod 30 can go into the top 22 of the opening 20, while the narrower bottom portion 23 of the keyhole is narrower than head 31 but will admit the neck 32 of the rod 30 as shown in Figure 6.

The inner face 35 of each head 31 is substantially flat and is substantially at right angles to the axis of the rod as shown particularly in Figure 10 and meets the end of the neck 32 at an abrupt angle. In contrast, each neck 32 meets the adjoining continuously-curved intermediate portion 33 in a curve 36 and similarly each said portion 33 is joined to the waist 34 in a continuous curve 37, so that the curves can function as cams and serve to expand the retaining means 50 in a manner to be explained hereafter. The rod 30 is preferably of a length to be contained wholly between the sides of the ring in which it is embodied, as shown particularly in Figure 1.

I provide a housing 40 across the ring from side to side to enclose the rod 30. It has a portion 41 at each end to support the rod 30, and an opening at 42 between the ends to receive the retaining means 50, as shown particularly in Figures 9, 12 and 16. As illustrated in Figures 7 to 9, the housing 40 is a box or tube having an internally cylindrical wall 43 with a diameter about the same as the heads 31 and continuously-curved intermediate portions 33 of rod 30, but with enough play to allow the rod 30 to slide and rotate easily in the housing 40. Each end portion of housing 40 has a median face 44 defining an end of the opening 42.

The retaining means as shown particularly in Figures 13 to 17, comprises a loop, resilient, substantially U-shaped member 50 having a normal inside diameter less than the diameter of the continuously-curved intermediate portions 33 and less than the diameter of heads 31. Member 50 surrounds rod 30 and is mounted in housing 40 substantially midway of the length of the recess therein with the plane of said member 50 substantially transverse to the axis of rod 30. Member 50 fits into the cut away portion 42 of the housing 40 as shown particularly at Figure 16 and is thus restrained from movement lengthwise of said housing.

Member 50 is in the form of a resilient split ring, open at the top, i. e., said member is of substantially U-shaped form, as shown particularly in Figure 14, and its inside diameter is of such a size that when said member is in relaxed normal condition, its inner surface or wall 51 is larger than the necks 32 or waist 34 of the rod 30 and is smaller than the continuously curved intermediate portions 33 and heads 31 of the rod 30 as shown in full lines in Figure 17. In that relaxed position, the distance between the free ends 52 of the member 50 is less than the smallest diameter of the rod 30. As shown in dotted lines in Figure 17, the free ends 52 of the member 50 can be forced apart, making the inner walls 51 large enough to hold the part of greatest diameter of the continuously-curved intermediate portions 33, but in this position of strain the distance between the free ends 52 of the member 50 is less than that diameter of the portions 33, so that it prevents accidental removal of member 50. In both the normal position shown in full lines and the strained position shown in dotted lines, the faces 53 of member 50 abut against the median faces 44 of the housing whereby member 50 is held against longitudinal displacement from the assembly. See especially Figures 16 and 18.

It will thus be seen that member 50 is resilient and is of substantailly U-shaped form, and that when rod 30 is moved axially within housing 40, the continuously-curved intermediate portions 33 act to cam open member 50 whereby the said rod is slidable through the substantially U-shaped member 50 to a locking position with a head and neck extending out of the housing 40, in which position the head 31 is adapted to go through and to cooperate with the opening 20 in ring A to lock the two rings A and B together.

In constructing and assembling the locking means, the parts can be made in a number of different ways. For example, the rod 30 can be made from a wire or bar having a cross section at least as large as the desired diameter of the heads 31 and continuously-curved intermediate portions 33, and then turning said wire or bar on a lathe until the desired configuration has been formed.

Housing 40 having the inner cylindrical walls and the cut away portion can be made integrally with ring B, as indicated in Figure 1.

If desired, the housing 40 can be made as a separate box. In the embodiment shown in Figures 2 to 16 the housing 40, is illustrated as a cylinder having a length which is the same as the distance from side to side of ring B which is to accommodate the sliding rod 30. In making such a box, a hollow wire or tube having an inner wall 43 with a diameter of a size to receive the heads 31 of the rod 30 can be cut away at 42 about midway of the length thereof leaving end portions 41 with median faces 44, joined by a central portion 45 of the tube at the top as shown particularly in Figures 7 and 9. A hole can be bored through the ring B from side to side thereof, substantially the same diameter as the outer diameter of the tube 40 and said tube can be inserted and soldered therein. In the embodiment shown in Figures 2 to 16, the cylinder is of a length to wholly contain the rod 30 within it. See particularly Figures 12 and 16.

If the ring B is hollow between its side walls, as shown in Figure 2, the box which constitutes the housing 40 can if preferred, be cut the length of the distance between the inside walls of said hollow portion. In this instance, the tube will be shorter than the rod 30, as shown in Figure 19. Here again the side walls of the ring B can be bored to receive the ends of the rod 30, and the box can be inserted upwardly in the hollow portion of the ring, aligned with the bored holes and soldered in place.

The retaining means 50 can conveniently be made of resilient wire bent to substantially U-shape, the diameter of the wire being about the same as the width of the cut away area 42 between ends 41 of the housing as shown in Figure 16. The resilient wire of which member 50 is constructed has a diameter or thickness which will be received selectively in the space between the two continuously-curved intermediate portions 33 or in the space between either of said portions 33 and an adjacent head 31 of the rod 30. See Figures 1 and 2.

The novel locking means may be assembled in a ring B in the following way:

A passage can be bored from side to side of the ring B. If there is a decorated or ornamental section on the ring B, the ends of the passage are located on a line with the center of the decorated portion. If the housing 40 is made integrally with the ring B, the passage may constitute the inner wall 43 of the housing 40. If the housing is formed separately, the passage through the ring B has a diameter to receive the housing 40 snugly. In this case, the housing 40 is inserted and soldered into the passage defined by the inner wall 43.

The rod 30 is inserted in the housing 40 in ring B and retaining means 50 is then sprung about the waist 34 of the rod 30 in the cut away portion 42 of the housing with face 53 of the retaining means 50 abutting faces 44 of the housing 40.

The parts are simple to construct and easy to assemble. Because the rod 30 is circular in cross section, no precaution need be taken in assembling it with the retaining means 50 and with the ring B. The fact that the ends of the rod 30 are alike is also an advantage in assembly. No orientation is necessary.

It will be noted that the rod 30 is able to rotate freely within the housing 40 and retaining means 50 at all times. It is also able to move back and forth in an axial direction, from side to side of the ring B, substantially parallel to the axis of the finger opening 61 of the ring. A head 31 can be projected out of either end of housing 40 provided said housing is open at both ends.

When the parts are assembled in ring B as described above, the parts lie in the position shown in Figure 1, with the rod 30 wholly within housing 40, and with retaining means 50 around waist 34 of the rod 30, and the faces 53 of said retaining means 50 abutting the median faces 44 of the housing 40. In this position, the rod 30 is held in retracted inoperative position by retaining means 50 which hugs the waist 34 of the rod 30. The spring retaining means 50 is in relaxed position; its faces 53 abut a continuously-curved intermediate portion 33 on each side. This prevents lengthwise movement of the rod 30 in the absence of force applied to said rod in the direction of its length.

The keyhole 20 in ring A may be formed in any manner. For example it may be cut in the side wall of the ring as part of the decoration of an ornamental portion of a gem setting. The shape of opening or keyhole illustrated in Figures 3 and 6 is substantially that of a tear-drop, having near the top of the gem setting a large substantially semi-circular part 22 from the diameter of which the lower part 23 becomes reduced to a point at the bottom. A keyhole of a different shape is shown in Figure 20; it has a substantially circular top portion and a narrow rectangular lower portion.

In order to operate the lock, the operator places the end of a pin or similar instrument, against a head 31 of the rod 30, for example the head at the left of Figure 1, and gives the pin a push. This forces the rod 30 forward to the right in the passage 43 of the housing 40. During this movement, the upwardly curved portion 37 of the continuously-curved intermediate portion 33 to the left of the retaining means 50 enters said retaining means and forces the free ends 52 of said retaining means apart as shown in dotted lines in Figure 17. The retaining means 50 then rides curved portion 36 of said continuously-curved intermediate portion 33, and onto neck 32, until face 53 of the retaining means 50 is stopped by inner face 35 of the head 31 on the left end of the rod 30 and the head 31 and neck 32 at the other end extend from the right side of ring B in operative position as shown in Figure 2. Now the opening 20 of ring A and the opening or housing 40 in ring B are placed in registry and the rod can be inserted as a key into keyhole 20 of ring A.

Head 31 of the rod 30 passes through the large upper part 22 of the slot in side wall 21 of ring A, as shown in Figure 4. Then with the neck 32 lying in said slot and the head 32 of the rod 30 lying within the hollow portion in the inside of the setting of the engagement ring A, ring B is pulled downwardly relative to ring A, so that the neck 32 of the rod 30 moves down into the narrow portion 23 of the opening 20 in the side wall of ring A to the position shown in Figures 5 and 6. In this position, the rings A and B cannot be pulled apart lengthwise of the rod, because head 31 of the rod is larger than the bottom portion 23 of the keyhole and because inner face 35 of head 31 abuts against wall 21 of the ring.

In this position shown in Figures 5 and 6, the finger openings 24 and 61 of rings A and B are aligned, and the two rings, fastened together, as shown in Figure 5, can be placed on the finger of the wearer. When the rings are thus on the finger they do not move with relation to each other because the finger of the wearer prevents their rotating or moving up and down in relation to each other.

I claim:

1. The combination of a first member having an opening extending inwardly from a side wall thereof; a second member having an elongated recess therein disposed in registry with the opening in said first member, which recess constitutes a housing for a locking member; a locking member slidably mounted in said elongated recess and comprising a rod of a length to be wholly contained within said recess and having on each end thereof a head and a neck of smaller size than the head, a waist between the necks, and continuously-curved intermediate portions of greater diameter than the necks and waist and located between said waist and each neck; in combination with means for retaining the locking member in the recess and for selectively holding the locking member in extended locking position with a head and neck portion projecting out of said recess or in a retracted, inoperative position wholly within said recess, said means comprising a resilient, substantially U-shaped member having a normal inside diameter less than the diameter of said continuously-curved intermediate portions, said U-shaped member mounted substantially midway of the length of said recess with the plane thereof substantially transverse to the axis of said locking member, said U-shaped member being restrained from movement lengthwise of said elongated recess, and said curved intermediate portions on said locking member acting to cam open said U-shaped member when a force is applied lengthwise of said locking member, whereby said locking member is slidable through said U-shaped member to a locking position with a head and neck extending out of said recess, in which position the head is adapted to go through the opening in the first member and to lock the first and second members together.

2. The combination of a first member having an opening therein extending inwardly from a side wall thereof; a second member having an opening extending from side to side thereof and disposed in registry with the opening in said first member and comprising a housing for a locking member; a locking member slidably mounted within said opening in said second member and comprising a rod of a length to be wholly contained between the sides of said second member and having on each end thereof a head and a neck of smaller size than the head, a waist between the necks, and continuously-curved intermediate portions of greater diameter than the necks and waist and located between said waist and each neck; in combination with means for retaining the locking member within the opening in said second member and for selectively holding the locking member in extended locking position with a head and neck portion projecting outwardly beyond a side of said second member or in a retracted, inoperative position wholly within said opening, said means comprising a resilient, substantially U-shaped member having a normal inside diameter less than the diameter of said continuously curved intermediate portions, said U-shaped member mounted substantially midway of the length of said opening in said second member and with the plane thereof substantially parallel to the side walls of said second member, said U-shaped member being restrained from movement lengthwise of the opening in said second member, and said curved intermediate portions acting to cam open said U-shaped member when an endwise force is exerted on said locking member, whereby said locking member is slidable in either direction through said U-shaped member to a locking position with a head and neck extending outwardly beyond a side of said second member, in which position said head is adapted to go through the opening in the first member and to lock the first and second members together.

3. The combination defined in claim 2 wherein the inner surfaces of the heads are at right angles to the axis of said locking member and are substantially parallel to the plane of said U-shaped member, whereby abutment of said surfaces against said U-shaped member prevents removal of said locking member from the opening in said second member, and whereby either side of said second member may optionally be locked with said first member.

4. The combination of a first finger ring with an ornamental portion and having an opening from a side thereof; a second finger ring with an ornamental portion and having an opening extending from side to side thereof and disposed in registry with the opening in the first finger ring whereby ornamental portions of the two rings are in registry, the opening in the second ring comprising housing mounting a locking member of a length to be wholly contained between the sides of said second ring and having on each end a head and a neck of smaller size than the head, a waist between the necks and a continuously-curved intermediate portion of greater diameter than the necks and waist and located between the waist and each neck; in combination with means for retaining the locking member in the housing and for selectively holding the locking member in extended locking position or in retracted, inoperative position comprising a resilient, substantially U-shaped member having a normal inside diameter less than the diameter of said intermediate portions, said U-shaped member mounted substantially midway of the length of said opening in said second ring and with the plane thereof substantially parallel to the side walls of said second ring, said U-shaped member being restrained from movement lengthwise of said opening in said second ring, said curved intermediate portions acting to cam open said U-shaped member when an endwise force is exerted on said locking member, whereby said locking member is slidable in either direction in the opening in said second ring to an operative locking position with a head and neck thereof extending beyond a side of said second ring in which position the head is adapted to go through the opening in the first ring and to lock the two rings together with said ornamental portions in registry, the inner surface of the head being at right angles to the axis of the rod, whereby abutment of the inner surface of a head against said U-shaped member prevents removal of the locking member from the second ring and whereby either side of the second ring may optionally be locked in registry with the first ring.

References Cited in the file of this patent

UNITED STATES PATENTS

| | | |
|---|---|---|
| 1,446,865 | Tueckmantel | Feb. 27, 1923 |
| 1,536,540 | Thomas | May 5, 1925 |
| 1,862,715 | Solliday | June 14, 1932 |
| 2,264,962 | Adams | Dec. 2, 1941 |
| 2,472,893 | Gerson | June 14, 1949 |
| 2,493,285 | Granat | Jan. 3, 1950 |
| 2,555,904 | Seidman | June 5, 1951 |
| 2,571,674 | Braunstein | Oct. 16, 1951 |
| 2,629,246 | Schumann | Feb. 24, 1953 |
| 2,668,605 | Schaeffer | Feb. 9, 1954 |